United States Patent

[11] 3,627,747

[72] Inventor Claude Marie Henri Emile Brouard
 Sotteville les Rouen, France
[21] Appl. No. 793,174
[22] Filed Jan. 22, 1969
[45] Patented Dec. 14, 1971
[73] Assignee Ugine Kuhlmann
 Paris, France
[32] Priority Jan. 25, 1968
[33] France
[31] 137335

[54] MIXED CHROMIUM COMPLEXES OF A PHENYLAZONAPHTHYL DYESTUFF AND A PHENYLAZOPHENYL DYESTUFF
2 Claims, No Drawings
[52] U.S. Cl.................................................. 260/145 A,
 8/13, 117/138.8 R, 8/42 R, 8/42 B, 8/43,
 117/138.8 R, 260/40 R, 260/575
[51] Int. Cl........................................................C09b 45/06,
 C09b 45/16, D06p 1/10
[50] Field of Search............................................. 260/145 A;
 8/41, 8

[56] References Cited
UNITED STATES PATENTS
| | | | |
|---|---|---|---|
| 2,673,199 | 3/1954 | Widmer et al. | 260/145 |
| 3,041,327 | 6/1962 | Buehler et al. | 260/145 |
| 3,163,634 | 2/1964 | Conrad | 260/145 |
| 3,169,951 | 2/1965 | Buehler et al. | 260/145 |

Primary Examiner—Floyd D. Higel
Attorney—Beveridge & DeGrandi

ABSTRACT: Mixed chromium complexes are provided of the type:
 (I)—CR—(II)
wherein (I) represents the residue of a monoazo dyestuff of the formula:

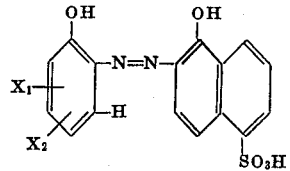

in which $X_1$ and $X_2$ each represent a hydrogen or chlorine atom or an alkyl or nitro group, (II) represents the residue of a monoazo dyestuff of the formula:

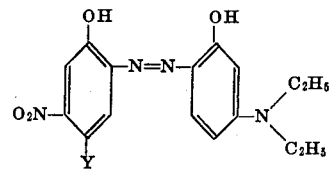

in which Y represents a hydrogen or chlorine atom. These complexes are suitable for dyeing animal fibers, synthetic fibers or mixtures thereof and the color shades obtained have good fastness to rubbing and wet tests and also have an excellent fastness to light.

MIXED CHROMIUM COMPLEXES OF A PHENYLAZONAPHTHYL DYESTUFF AND A PHENYLAZOPHENYL DYESTUFF

The present invention relates to new mixed metalliferous complexes of azo dyestuffs represented by the following scheme:

(I)Cr—(II)    (III)

in which (I) represents the residue of a monoazo dyestuff of the general formula:

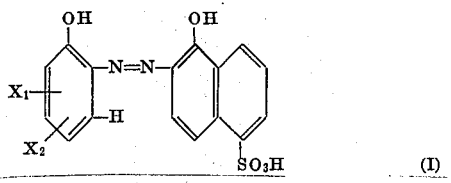

(I)

in which $X_1$ and $X_2$ each represent hydrogen or chlorine atoms or alkyl or nitro groups, and (II) represents the residue of a monoazo dyestuff of the general formula:

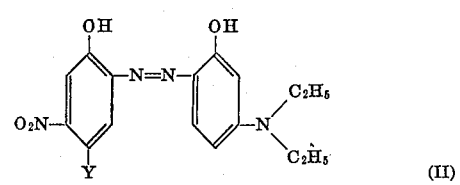

(II)

in which Y represents a hydrogen or chlorine atom.

The mixed complexes of formula (III) may be obtained, for example, by the action, in a neutral or alkaline medium, of a chromium complex of an aliphatic or aromatic o-hydroxy-carboxylic acid, such as salicyclic or tartaric acids, on an equimolecular mixture of dyestuffs of formulas (I) and (II), or alternatively a 1:1 chromium complex of a dyestuff of formula (I) may be reacted in a neutral or alkaline medium with a dyestuff of formula (II).

The mixed complexes thus obtained are especially suitable for dyeing, preferably in the presence of a weak organic acid for example in an acetic acid medium, animal fibers such as for example silk, leather or wool, and synthetic fibers based on polyamides or polyurethanes, as well as mixed fibers, for example, wool-polyamides. The navy blue shades obtained have good fastness to rubbing and wet tests and an excellent fastness to light.

The dyestuffs of formula (I) may be prepared for example by coupling, in a neutral or alkaline medium, 5-sulpho-1-naphthol with the diazo derivative of an amine of the formula:

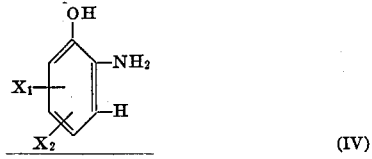

(IV)

$X_1$ and $X_2$ having the same significance as above.

Examples of amines of formula (IV) are 4-chloro-1-hydroxy-2-amino-benzene, 4-chloro-5-nitro-1-hydroxy-2-amino-benzene, 4-nitro- and 5-nitro-1-hydroxy-2-amino-benzenes, 4,6-dichloro-1-hydroxy-2-amino-benzene, and 4-methyl-6-nitro-1-hydroxy-2-amino-benzene.

The dyestuffs of formula (II) may be prepared for example in a similar way by coupling 3-diethylamino-phenol with the diazo derivative of 5-nitro-1-hydroxy-2-amino-benzene or 4-chloro-5-nitro-1-hydroxy-2-amino-benzene.

In the following examples, which are purely illustrative, the parts indicated are parts by weight and the temperatures are in degrees Centigrade.

EXAMPLE 1

The 1:1 chromium complex obtained from 39.9 parts of [4-nitro-2-hydroxy-benzene]—<1 azo 2>—[1-hydroxy-5-sulpho-naphthalene] is mixed with 33 parts of [4-nitro-2-hydroxy-benzene] —<1 azo 1>—[2-hydroxy-4-diethylamino-benzene] in 1,000 parts of water. The mixture is heated to 90°–95° C., then caustic soda is added until the pH gradually rises to 8–9. When the nonmetallized monoazo dyestuff has disappeared, the solution is filtered, then the mixed chromiferous dyestuff is salted out by the addition of sodium chloride, filtered off and dried. It dyes wool and polyamide fibers a navy blue shade, with a very high-tinctorial yield, and with very good fastness, especially to light.

The following table groups together other examples of mixed chromiferous complexes of formula (III).

| Example | (I) | (II) | Shade |
|---|---|---|---|
| 2 | [5-chloro-2-hydroxy-benzene]—<1 azo 2>—[1-hydroxy-5-sulpho-naphthalene] | [4-nitro-2-hydroxy-benzene]—<1 azo 1>—[2-hydroxy-4-diethylamino-benzene] | Navy blue |
| 3 | [5-nitro-2-hydroxy-benzene]—<1 azo 2>—[1-hydroxy-5-sulpho-naphthalene] | [4-nitro-2-hydroxy-benzene]—<1 azo 1>—[2-hydroxy-4-diethylamino-benzene] | Navy blue |
| 4 | [5-chloro-4-nitro-2-hydroxy-benzene]—<1 azo 2>—[1-hydroxy-5-sulpho-naphthalene] | [4-nitro-2-hydroxy-benzene]—<1 azo 1>—[2-hydroxy-4-diethylamino-benzene] | Navy blue |
| 5 | [5-methyl-3-nitro-2-hydroxy-benzene]—<1 azo 2>—[1-hydroxy-5-sulpho-naphthalene] | [4-nitro-2-hydroxy-benzene]—<1 azo 1>—[2-hydroxy-4-diethylamino-benzene] | Navy blue |
| 6 | [4-nitro-2-hydroxy-benzene]—<1 azo 2>—[1-hydroxy-5-sulpho-naphthalene] | [4-nitro-5-chloro-2-hydroxy-benzene]—<1 azo 1>—[2-hydroxy-4-diethyl-amino-benzene] | Navy blue |

I claim:

1. Mixed chromium complex containing one atom of chromium in complex union with one molecule of monoazo dyestuff of the formula:

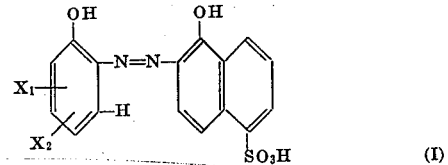

(I)

in which $X_1$ and $X_2$ each represent hydrogen, chlorine, methyl or nitro and with one molecule of monoazo dyestuff of the formula:

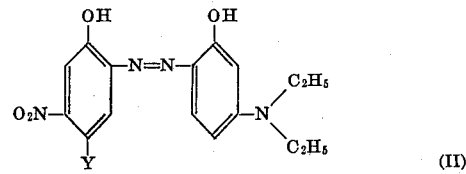

(II)

in which Y is hydrogen or chlorine.

2. Mixed chromium complex according to claim 1 in which the monoazo dyestuffs (I) is [4-nitro-2-hydroxy-benzene]—<1 azo 2>—[1-hydroxy-5-sulpho-naphthalene] and Y is hydrogen.

* * * * *